March 23, 1926. 1,577,534
E. B. MILLER
METHOD AND APPARATUS FOR SEPARATING OR RECOVERING
A GAS FROM A MIXTURE OF GASES
Filed June 15, 1922 3 Sheets-Sheet 3
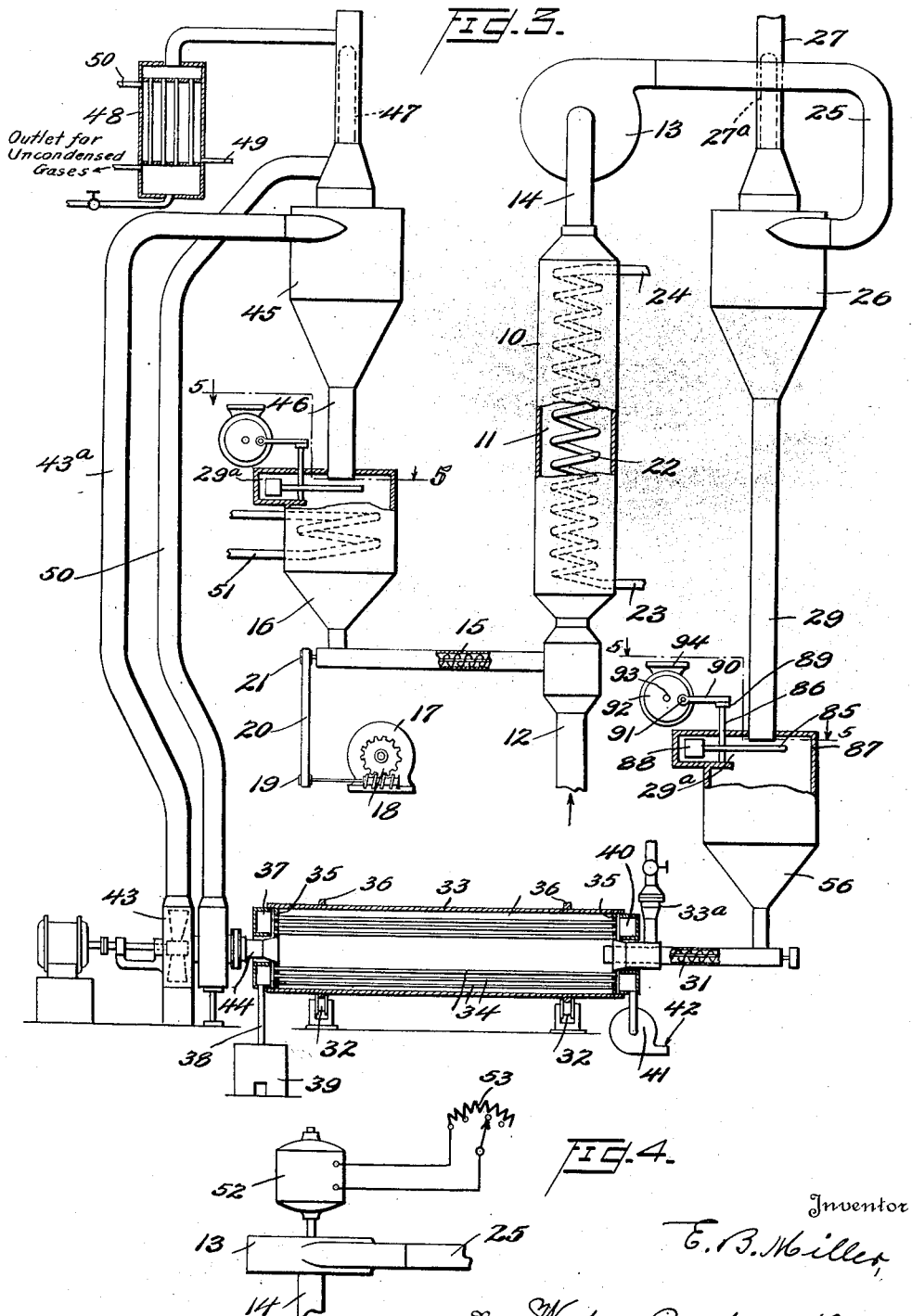

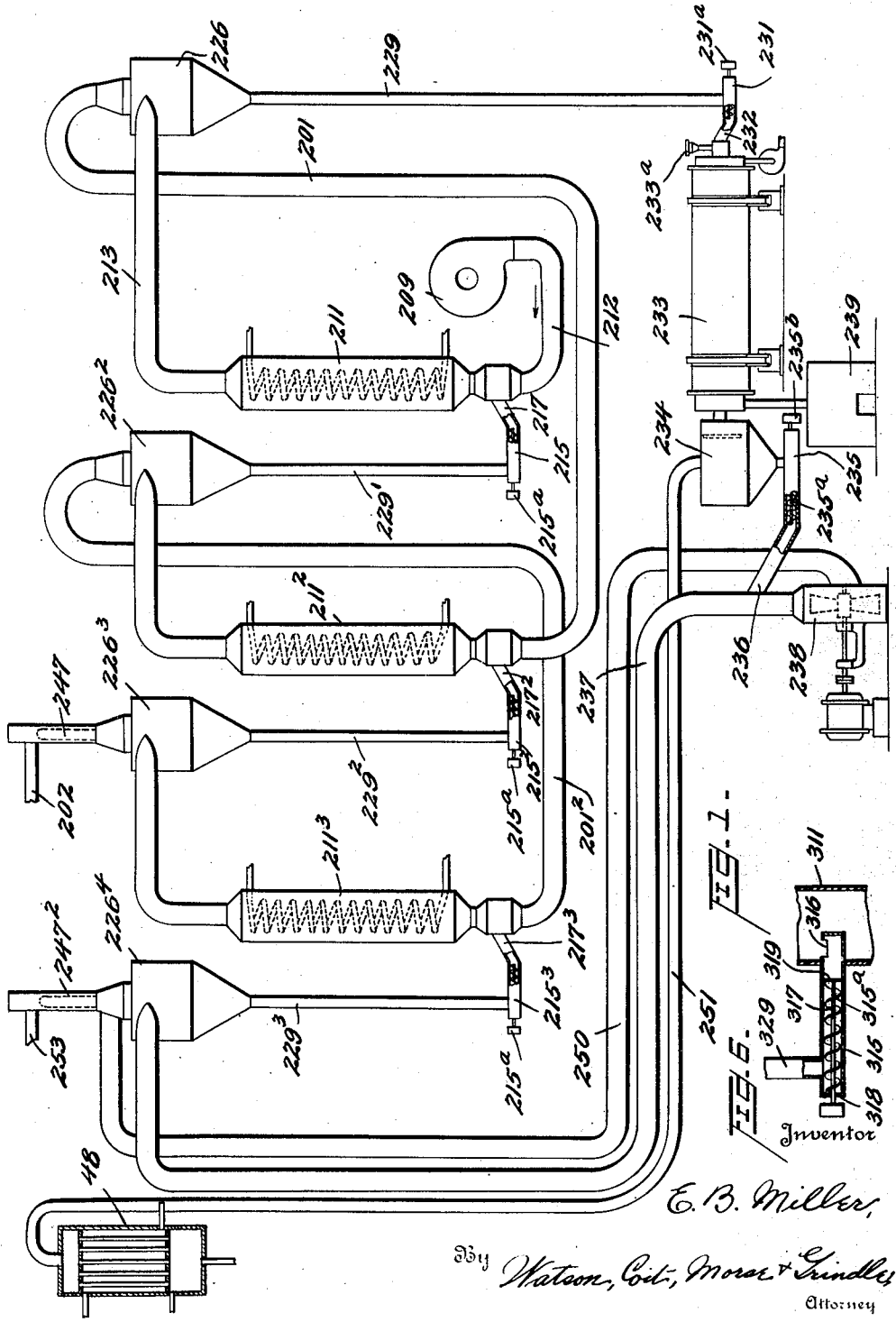

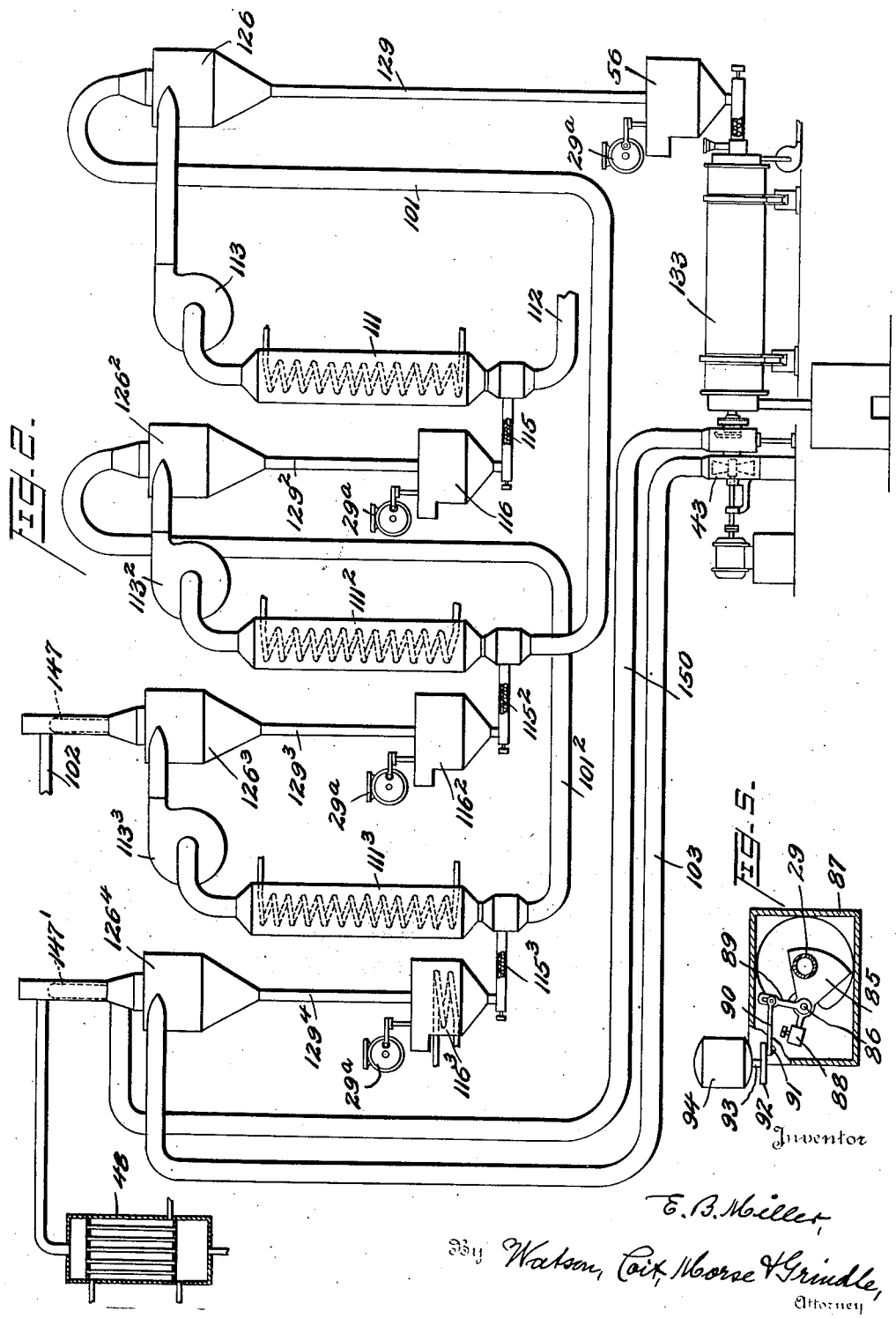

Patented Mar. 23, 1926.

1,577,534

UNITED STATES PATENT OFFICE.

ERNEST B. MILLER, OF BALTIMORE, MARYLAND, ASSIGNOR TO THE SILICA GEL CORPORATION, OF BALTIMORE, MARYLAND, A CORPORATION OF MARYLAND.

METHOD AND APPARATUS FOR SEPARATING OR RECOVERING A GAS FROM A MIXTURE OF GASES.

Application filed June 15, 1922. Serial No. 568,666.

*To all whom it may concern:*

Be it known that I, ERNEST B. MILLER, a citizen of the United States, and residing at Baltimore city, State of Maryland, have invented certain new and useful Improvements in Methods and Apparatus for Separating or Recovering a Gas from a Mixture of Gases, of which the following is a specification.

The present invention relates to a method and apparatus for separating or recovering a gas or vapor from a mixture of gases or vapors. The present application is a continuation in part of my application 384,332 filed May 26, 1920.

The method consists in injecting pulverized adsorbing material, such as silica gel, into a stream of the gas mixture from which it is desired to separate one or more constituents, the gas stream carrying along with it the pulverized adsorbing material in suspension, separating the adsorbent from the gases after it has adsorbed therefrom the desired constituent and thereafter liberating the adsorbed substance from the adsorbing material. The method may be employed for the separation from each other of any two gases or vapors, provided the gases or vapors which it is desired to separate from each other have a sufficient difference in their boiling points. The most common examples of such separations are the removal of moisture from air or other so-called permanent gases and the separation and recovery of the vapors of volatile liquids, such as sulphur dioxide, ether, alcohol, acetone, benzol, gasoline, etc., from mixtures with air or other so-called fixed or permanent gases. In such cases, the adsorption is effected at normal atmospheric temperature or the temperature of the cooling water available.

One of the principal aims of the present invention is to provide a method and apparatus for separating a gas from a mixture of gases, which require only relatively small investment and can be carried out economically.

Another aim of the invention is to provide a method and apparatus which require a smaller quantity of the adsorbing material per unit of gas than heretofore.

It is an aim of the present invention to provide a method and apparatus whereby a gas or vapor may be separated or recovered from a mixture of gases or vapors continuously without any interruption, the adsorbing material, which is preferably silica gel, being used over and over.

Another aim of the present invention is the provision of a plurality of adsorbing units arranged to act one after the other on the stream of gases.

It is a further aim of the invention to feed the adsorbing material from one unit of the apparatus to another in a counter-direction to the movement of the gases from one unit to another, so that fresh adsorbing material comes in contact with the gases just before they are discharged, while the entering gases come in contact with adsorbing material which has passed through all the other units.

Another aim of the invention is to provide means to prevent passage of gases through the adsorbent discharge pipe of the separators.

Other objects and features of novelty will be apparent from the description taken in connection with the drawings in which:

Figure 1 is a more or less diagrammatic illustration of an apparatus constructed in accordance with the present invention;

Figure 2 is a similar diagrammatic view of another form of the invention;

Figure 3 is a diagrammatic view of a single unit type of apparatus;

Figure 4 is a plan view showing one means of controlling the speed of the blowers;

Figure 5 is a sectional plan view taken substantially on the line 5—5 of Figure 3 showing a feed device; and Figure 6 is an elevation partly in section of another feed device.

Referring to the drawings, and more particularly Figure 3, the apparatus therein shown as one means of carrying out the invention comprises a casing 10 forming a chamber 11. The gases, from which one or more constituents are to be removed, continuously enter at the lower end of the chamber as at 12, flow of the gases being effected in any suitable manner as by means of a suction fan 13 connected to the upper end of the chamber by a conduit 14. The adsorbing material, which, as previously stated, preferably consists of pulverized silica gel, is continually fed by a worm conveyor 15 from the hopper 16 into the stream of gases at a point near the lower end of the chamber 11. This silica gel is a hard porous material having ultramicroscopic pores and capable of adsorbing about 21% of its own weight of water vapor at 30° C. and at a partial pressure of substantially 22 mm. of mercury. The worm 15 is driven in any suitable manner as by a motor 17. As shown, the motor through a worm and gear 18 drives a pulley 19 connected by a belt 20 to a pulley 21 on the feeder shaft.

The gases and powdered adsorbing material are carried along through the chamber 11, the adsorption taking place while the substances are in motion. If necessary, suitable heat transferring means may be provided to carry off the heat of adsorption. As shown, a conduit 22 is disposed within the chamber and cooling water is supplied thereto through the pipe 23 at the lower end thereof and taken off by pipe 24 at the upper end. The cooling device also acts as a baffle to effect intimate contact of the gases and adsorbing material.

The next step in the process consists in the separation of the adsorbing material from the stream of gases. Any suitable means which will separate the gases and material continuously may be employed. As shown, the exhaust fan 13 discharges, by means of conduit 25, into a cyclone or continuous separator 26. The adsorbing material charged with the gas which it has adsorbed settles to the bottom of this separator, while the gases pass out through the outlet 27. If desired a separating means such as a bag separator 27$^a$ may be disposed in the outlet pipe to prevent the loss of any of the adsorbent material.

The next step in the method consists in freeing the adsorbing material from the gas it has adsorbed. This is termed "activating" the material. As shown, the gel separated out by the separator 26 is delivered to the activator by passing downwardly through the pipe 29 to a hopper from which the gel is fed by a screw conveyor 31 into the activator, the conveyor being driven similarly to the conveyor 15. For the purpose of preventing passage of gases through the lower end of pipe 29, a novel feeder 29$^a$ is provided. As shown in Figure 5 it comprises a plate 85 carried by an oscillating shaft 86 disposed in a box 87 having a hopper bottom 56 (Figure 3). The plate 85 is disposed horizontally and is counter-balanced by the weight 88. As shown in Figure 3, the plate is disposed a slight distance below the lower end of the outlet pipe 29 of the cyclone separator 26. The plate is oscillated back and forth in a horizontal plane in any suitable manner but the extent of oscillation is not sufficient to open up the lower end of the cyclone at any time. For the purpose of oscillating the shaft 86 any suitable mechanism may be employed. As shown, an arm 89 is secured to the upper end of the shaft and outside the box 87. This arm is connected by a link 90 to a crank pin 91 on the crank disk 92, the latter being carried by the armature shaft 93 of the motor 94. In operation, the continual oscillation of the plate 85 effects a uniform feed of the adsorbing material into the hopper 56 but at no time permits passage of gases.

Any suitable activator may be employed. In the drawings the activator is illustrated as comprising a cylinder, rotatably mounted on rollers 32 and provided with suitable heating means. Thus, as shown, the activator may comprise a cylindrical shell 33 with tubes 34 connecting the opposite heads 35. The shell is provided with circumferential rings 36 supported by the rolls 32, whereby the cylinder as a whole may be rotated. Hot gases are supplied to chamber 37 through the pipe 38 from furnace 39. The chamber 37 is in communication with the interior of the tubes 34 so that hot gases pass through the tubes to the chamber 40 at the opposite end of the cylinder. The chamber 40 is in communication with a suction fan 41 having the outlet pipe 42, whereby the flow of the hot gases is effected.

A blower 43 effects a flow of the pulverized adsorbing material, liberated gas and a small quantity of air or steam, being connected to the outlet of the activator by a pipe 44. The small quantity of air or steam, just mentioned, is drawn into the activator through a valve controlled inlet 33$^a$. The blower 43 delivers the stream of gases and adsorbing material through pipe 43$^a$ to a continuous or cyclone separator 45 wherein the adsorbing material is separated from the gases and delivered to the hopper 16, previously mentioned, a conduit 46 being provided for this purpose. A feed valve 29$^a$, like the one at the foot of pipe 29, controls the delivery of the material into the hopper 16 and prevents passage of gases. The stream of gases from the cyclone separator passes through a separating means such as a bag separator 47 and then may be permitted to escape. The bag separator is provided for the purpose of preventing the escape of any of the pulverized adsorbing material. Any such material caught by the bag separator falls downwardly through the cyclone separator to the hopper 16.

In case the apparatus is used for the recovery of a valuable constituent of a mixture, such as the vapor of ether, alcohol, acetone or gasoline, etc., this constituent may be condensed in a condenser 48 through which the gases pass after leaving the bag conveyor 47 instead of escaping into the atmosphere. This condenser is supplied with cooling water entering at 49 and leaving at 50.

In case steam is supplied at the inlet 33ᵃ of the activator and the substance to be recovered is a liquid immiscible with water, there will be two layers in the condenser 48 and the separation of the desired liquid will be easy. On the other hand, if the liquid desired to be recovered is miscible with water, the condensate may require subsequent fractionation. The quantity of steam or air required to displace the adsorbed material in a given time decreases with an increase of temperature in the activator, so that, if it is desired to decrease the amount of steam necessary under given operating conditions, this may be done by raising the temperature.

Preferably the gas outlet of the separator is connected with the intake of blower 43 so that a portion of the gases leaving the separator are returned to, the blower and again used to carry adsorbing material to the separator. For this purpose a pipe 50 is provided, connecting the gas outlet of the separator and the blower inlet pipe 44. With this arrangement less air, steam or other gas is required to be supplied through inlet 33ᵃ, and a greater velocity of the gases is maintained in pipe 43ᵃ, so that the adsorbing material is elevated to the separator along with the gases.

In case the adsorbing material is returned to the hopper 16 at too high a temperature, it may be cooled in any suitable manner. For this purpose, a water cooling pipe 51 is shown as passing through the reservoir.

It is desirable that the difference in pressure between the hopper 16 and chamber 11 may be regulated. To this end the speed of the exhauster 13 may be adjusted. As shown in Figure 4, the fan is driven by a motor 52 having a resistance 53 which may be adjusted to vary the speed of the motor. It will be understood further that the motors for driving the screw conveyors are also adjustable in speed so that the quantity of adsorbent fed to the adsorbing chamber and the activator may be regulated to suit the conditions.

In operation, it will be understood that the mixture of gases from which one constituent is to be separated or recovered is fed into the adsorbing chamber through the inlet 12. Adsorbing material, such as pulverized silica gel, is fed into the stream of gases by the screw conveyor 15. The flow of gases through the chamber is effected by the suction fan 13. The silica gel is separated from the gases by the continuously acting cyclone separator 26 and delivered to the activator 33 wherein the gel is liberated of its adsorbed gas or vapor. The flow of gases and silica gel from the activator is effected by the blower 43 and the gel is again separated from the stream of gases by the cyclone separator 45 and delivered to again be fed into the adsorbing chamber. If the gas or vapor liberated from the gel is to be recovered it will be delivered from the bag separator 47 to the condenser 48.

The apparatus just described consists of what may be termed a single unit. Usually, for the most efficient operation it is best to employ a plurality of units and an apparatus consisting of three units will now be described, it being understood that more or less than three units may be employed, if desired. To further simplify the description, the apparatus will be described as used for the separation of moisture from air and employing pulverized silica gel as the adsorbent.

Referring now to Figure 2, the air to be treated enters the apparatus at 112, meets the pulverized silica gel fed into the stream by the screw conveyor 115. The mixture of air and silica gel passes through the adsorbing chamber 111, the flow being effected by the suction fan 113. From the fan the mixture is delivered to the continuous or cyclone separator 126 wherein the silica gel is separated from the gases and delivered to the activator 133. The gases separated in the separator are conveyed by a conduit 101 to the second adsorbing chamber 111², the silica gel being fed into the stream by the conveyor 115². Proper flow through the chamber is secured by a suction fan 113² and again the pulverized silica gel is separated from the mixture by a cyclone separator 126², the silica gel being delivered to a hopper 116 from which it is supplied to the first adsorbing chamber, there being a feed valve 29ᵃ at the lower end of the pipe 129² connecting the separator and receiver.

The gases separated by the second cyclone separator 126² are delivered by the conduit 101² to a third adsorbing chamber 111³, the pulverized gel being fed into the stream by screw conveyor 115³. Proper flow through the third chamber is secured by a third suction fan 113³ and the silica gel is separated from the gases by a third cyclone separator 126³ and delivered to a hopper 116² from which it is fed to the second adsorbing chamber there being a feed device 29ᵃ at the foot of the pipe 129³ connecting the separator and hopper. The dried air leaving the cyclone separator 126³ passes through a separating means such as a bag separator 147 and is conducted away through the outlet 102.

The silica gel separated by the separator 126 falls through the pipe 129 to a hopper 56, there being a feed valve 29ᵃ, and is fed into the activator 133. The gases and pulverized gel are discharged from the activator through a conduit 103 by a blower 43 and delivered to a cyclone separator 126⁴ which separates the silica gel from the gases and delivers it to a receiver 116³ from which it is fed by the conveyor 115³ into the stream of gases entering the third adsorbing chamber, there being a feed device 29ᵃ at the foot of the pipe 129⁴ connecting the separator and receiver. The gases leaving the cyclone separator 126⁴ pass through a bag separator 147′ and then escape into the atmosphere or pass to a condenser 48 in case it is desired to recover the substance adsorbed by the silica gel. A return gas pipe connects the outlet of the separator 126⁴ and the inlet of blower 43 as explained in connection with Figure 3.

It is to be noted that the path of the air being treated from one adsorbing chamber to another is in one direction through the apparatus, while the silica gel passes through the apparatus in the opposite direction. In the apparatus shown diagrammatically, the air passes from the right toward the left while the silica gel moves from the left toward the right. Thus, freshly activated silica gel is fed into the last adsorbing chamber, and on the other hand the fresh air to be treated is acted upon by gel fed from conveyor 115, which gel has already been through two adsorbing chambers and is, therefore, partially saturated with the moisture being adsorbed from the air. This counter-movement of air and silica gel gives a very efficient action.

It will be noted that there is no mechanical handling of the adsorbent, other than the air lifts and screw conveyors. The adsorbent is finely powdered and there is no tendency for it to settle out except in the cyclone and bag separators.

As the adsorbent circulates continuously in a closed cycle, losses of the adsorbent are practically nil.

The at present preferred form of the invention is illustrated in Figure 1. This figure shows a three unit type of apparatus similar to that shown in Figure 2. However, its construction is simplified in some respects. Thus the flow of gases through the apparatus may be effected by a single means such as a blower placed at the entrance or a suction device at the exit, of the apparatus, so that the blowers 113, 113² and 113³ of the apparatus shown in Figure 2 are eliminated. Furthermore, a different type of means is employed for sealing the material outlet opening from the separators 126, 126², 126³, etc.

Referring more in detail to the form of the invention shown in Figure 1, the mixture of gases is fed to the adsorbing chamber 211 through pipe 212 under sufficient pressure so that the flow thereof is maintained throughout the apparatus. This may be effected in any suitable manner as by means of a compressor or fan 209. The adsorbing material, such as silica gel, is fed into the stream of gases from the pipe 217. The mixture of adsorbing material and gases is discharged from the chamber through pipe 213 into a continuously acting separator 226 wherein the adsorbing material is separated from the gases. The gases separated by the separator 226 are conveyed by a pipe 201 to a second adsorbing chamber 211². Pulverized adsorbing material is fed into the stream of gases entering this second chamber from pipe 217². The adsorbing material is separated from the mixture discharged from this chamber by means of a continuously acting separator 226², the adsorbing material falling through pipe 229′ to conveyor 215 discharging into pipe 217 and the gases being conveyed by pipe 201² to a third adsorbing chamber 211³. The pulverized adsorbing material is fed into the stream of gases entering this third chamber from pipe 217³, and is separated from the mixture discharged from the chamber by means of the continuously acting separator 226³. The adsorbing material falls through pipe 229² to the conveyor 215² discharging into pipe 217² while the gases pass through a bag separator 247 and are conducted away through outlet pipe 202. The bag separator prevents any of the adsorbing material from being lost. At intervals it is shaken and any adsorbing material collected thereby falls through the separator 226³ and then into the conveyor 215².

The adsorbing material separated by separator 226 falls through pipe 229 to a conveyor 231. It may be fed by this conveyor into an activator 233, preferably of the structure previously described. This feed may be effected with an improved device which prevents flow of gases in either direction. Thus the conveyor 231 comprises a worm in a horizontal pipe connected with an upwardly inclined section of pipe 232, which discharges into the activator. As shown, the worm conveyor is provided with a pulley 231ᵃ or other suitable means whereby it may be rotated. In operation the conveyor feeds the adsorbing material toward the activator, filling up the inclined pipe 232. There being no conveyor in this inclined piece of pipe, the adsorbing material is forced into the activator at the upper end of this pipe by the pressure on the material exerted by the worm conveyor. The inclined pipe 232 being filled with adsorbing material acts as a seal to prevent passage of gases in either direction.

A like feeding device is provided in connection with each one of the chambers 211, 211² and 211³ for feeding the adsorbing material into the stream of gases. Thus the pipe 229′ supplies the worm conveyor 215 driven through pulley 215ª, and said conveyor is in communication with an upwardly inclined pipe 217 which discharges into the stream of gases.

In a similar manner the pipe 229² supplies the worm conveyor 215² adapted to force the adsorbing material upwardly through the inclined pipe 217². Likewise the pipe 229³ discharges into a horizontal conveyor 215³ which forces the adsorbing material upwardly through the inclined pipe 217³ into the stream of gases. In each case the material in the inclined pipe acts as a seal to prevent passage of gases.

From the activator 233 the adsorbing material is discharged into a settling chamber 234 which supplies adsorbing material to the horizontal pipe 235 having the worm conveyor 235ª driven by means connected with the wheel or pulley 235ᵇ. The conveyor 235ª forces the adsorbing material upwardly through an inclined pipe 236 discharging the same into the pipe 237 which is in communication with a fourth continuous separator 226⁴. The flow of the gases and adsorbing material is effected in pipe 237 by means of a blower 238 which discharges into the conduit 237. It will be seen with this arrangement of the fan 238 and the device for feeding the adsorbing material into the conduit 237, the adsorbing material does not come in contact with the blades of the fan or blower and consequently the life of the fan is much longer than where the silica gel passes directly through the fan, as in the arrangement shown in Figures 2 and 3.

As in the other forms of the invention described herein, the gas outlet of the separator 226⁴ is connected to the intake of blower 238 by a pipe 250 so that the gases are used over and over to raise the silica gel in pipe 237 without the admission of additional air or gas at the intake of blower 238.

The top of the settling chamber 234 is connected by pipe 251 to the gas inlet of a condenser 48 in case it is desired to recover the gas liberated from the pores of the absorbing material. If it is not desired to recover this gas, then pipe 251 discharges into the atmosphere through a suitable filter to prevent loss of any of the adsorbing material.

In the activator 233 the substances adsorbed in the pores of the adsorbing material are driven out, heat for this purpose being supplied from furnace 239 and steam, air or any other desired gas being admitted through the valve controlled inlet 233ª.

The gases separated out in the separator 226⁴ pass through a bag separator 247² and then may be permitted to escape into the atmosphere through pipe 253. The bag separator is provided for the purpose of preventing the escape of any of the pulverized adsorbing material. Any of this material caught by the bag separator falls downwardly through the cyclone separator into the conveyor 215³.

The operation of this form of apparatus is like that shown by Figure 2 and needs no further explanation.

Another form of feeding and sealing device is shown in Figure 6. This feeder operates on the same principle as the feeders illustrated in Figure 1 except that the inclined sections of pipe 217, 217², 217³, 232 and 236 are omitted, and a single horizontal pipe 315 employed. Both ends of this pipe are closed but near the discharge end and within the chamber 311 into which the material is to be fed, is an outlet 316 formed in the upper part of the cylindrical wall of the pipe. Material is supplied to the pipe through inlet 329 and it is fed along the pipe by a worm conveyor 315ª or other suitable means. The conveyor does not extend throughout the length of the pipe 315, but ends short of the outlet 316. Thus the worm is mounted on a shaft 317 having bearings at 318 and 319, the former being in the end wall and 319 within the pipe near the outlet 316. With this construction the worm will advance the material to the space below the outlet 316, which will thus fill up and finally material will overflow from the outlet 316. Because the outlet is located in the upper side of the pipe or above the conveyor the pipe will always be full of material and thus be sealed against passage of gases in either direction.

The term "gas" throughout the specification and claims is intended to include vapors as well as gases, and also any substance which may be adsorbed as a gas or vapor but may later turn to a liquid in the pores of the adsorbing material.

If desired the treatment of the gases may be effected under pressure. In this case the compressor 209 supplies the mixture of gases under such a pressure that a predetermined pressure is obtained in the exit pipe 202.

It is to be understood that the invention is not limited to the apparatus shown and described but includes modifications and changes that come within the scope of the appended claims.

Having thus described my invention what I claim as new and desire to secure by Letters Patent is:

1. The method of separating a gas from a mixture of gases consisting in feeding finely dividing porous solid gas adsorbing material into a stream of said mixture of gases so that it is carried along thereby in suspension, said material having pores of the proper size to adsorb said gas and thereafter permit its easy liberation, separating the adsorbing material and gases, treating the material to liberate the gas adsorbed thereby and returning the material for use again, all of said steps being performed in a continuous closed cycle.

2. The method of separating a gas from a mixture of gases, consisting in feeding finely divided porous solid gas adsorbing material into a stream of said mixture of gases so that it is carried along thereby in suspension, said material having pores of substantially the same size and volume as in silica gel, separating the adsorbing material and gases, treating the material to liberate the gas adsorbed thereby, and returning the material for use again, all of said steps being performed in a continuous closed cycle.

3. The method of separating a gas from a mixture of gases consisting in feeding finely divided silica gel into a stream of said mixture of gases so that it is carried along thereby in suspension, separating the gel and gases, treating the gel to liberate the gas adsorbed thereby, and returning the gel for use again, all of said steps being performed in a continuous closed cycle.

4. The method of separating a gas from a mixture of gases consisting in feeding finely divided porous solid gas adsorbing material into a stream of said mixture of gases so that it is carried along thereby in suspension, said material having pores of the proper size to adsorb said gas and thereafter permit its easy liberation, separating the adsorbing material and gases, heating the material to liberate the gas adsorbed thereby, cooling the material and returning it for use again, all of said steps being performed in a continuous cycle.

5. The method of separating a gas from a mixture of gases, consisting in feeding finely divided porous solid gas adsorbing material into a stream of said mixture of gases so that it is carried along thereby in suspension, said material having pores of substantially the same size and volume as in silica gel, separating the adsorbing material and gases, heating the material to liberate the gas adsorbed thereby, cooling the material and returning it for use again, all of said steps being performed in a continuous closed cycle.

6. The method of separating a gas from a mixture of gases consisting in feeding finely divided silica gel into a stream of said mixture of gases so that it is carried along thereby in suspension, separating the gel and gases, heating the gel to liberate the gas adsorbed thereby, cooling the material and returning it for use again, all of said steps being performed in a continuous closed cycle.

7. The method of separating a gas from a mixture of gases consisting in feeding finely divided porous solid gas adsorbing material into a stream of said mixture of gases so that it is carried along thereby in suspension, said material having pores of the proper size to adsorb said gas and thereafter permit its easy liberation, separating the adsorbing material and gases, treating the material to recover the gas adsorbed thereby and returning the material for use again, all of said steps being performed in a continuous closed cycle.

8. The method of separating a gas from a mixture of gases consisting in feeding finely divided porous solid gas adsorbing material into a stream of said mixture of gases so that it is carried along thereby in suspension, said material having pores of substantially the same size and volume as in silica gel, separating the adsorbing material and gases, treating the material to recover the gas adsorbed thereby, and returning the material for use again, all of said steps being performed in a continuous closed cycle.

9. The method of separating a gas from a mixture of gases consisting in feeding finely divided silica gel into a stream of said mixture of gases so that it is carried along thereby in suspension, separating the gel and gases, treating the gel to recover the gas adsorbed thereby, and returning the gel for use again, all of said steps being performed in a continuous closed cycle.

10. The method of separating a gas from a mixture of gases consisting in adsorbing the gas in a finely divided porous solid gas adsorbing material carried along in suspension, said material having pores of the proper size to adsorb said gas and thereafter permit its easy liberation, continuously separating the adsorbing material and gases, treating the material to liberate the gas adsorbed thereby and returning the material for use again, all of said steps being performed in a continuous closed cycle.

11. The method of separating a gas from a mixture of gases consisting in adsorbing the gas by a finely divided porous solid gas adsorbing material carried along in suspension in a stream of said mixture of gases, said material having pores of the proper size to adsorb said gas and thereafter permit its easy liberation, separating the adsorbing material and gases, treating the material to liberate the gas adsorbed thereby, condensing said liberated gas and returning the material for use again, all of said steps being performed in a continuous closed cycle.

12. Apparatus of the character described including in combination, a conduit, means to feed finely divided porous solid gas adsorbing material into said conduit, means to effect a flow of gases in said conduit at a velocity sufficient to carry the adsorbing material along in suspension therein, means to separate the gases and material, means to activate the material, and means to return the material to said feeding means, said various means being connected so that the adsorbing material moves in a continuous closed cycle.

13. Apparatus of the character described including in combination, a conduit, means to feed finely divided porous solid gas adsorbing material into said conduit, means to effect a flow of gases in said conduit at a velocity sufficient to carry along the material in suspension therein, means to separate the material from the gases, means to activate the material, means to cool the material, and means to return the adsorbent to said feeding means, said various means being connected so that the adsorbing material moves in a continuous closed cycle.

14. In apparatus of the character described, in combination, an activator to liberate the adsorbed substances from the pores of a porous adsorbing material, a separator to separate the material from the gases discharged from said activator, and a return pipe connecting the vapor discharge of said separator with the activator.

15. Apparatus of the character described including in combination, a conduit, means to feed finely divided porous solid gas adsorbing material into said conduit, means to effect a flow of gases in said conduit at a velocity sufficient to carry the adsorbing material along in suspension therein, means to separate the gases and material, means to activate the material, a condenser for condensing the condensible vapors given off in the activation, and means to return the material to said feeding means, said various means being connected so that the adsorbing material moves in a continuous closed cycle.

16. Apparatus of the character described including in combination, a conduit, means to feed finely divided porous solid gas adsorbing material into said conduit, means to effect a flow of gases in said conduit at a velocity sufficient to carry along the material in suspension therein, means to separate the material from the gases, means to activate the material, means to cool the material after its activation, means to condense and recover vapors given off in the activation, and means to return the adsorbent to said feeding means, said various means being connected so that the adsorbing material moves in a continuous closed cycle.

17. Apparatus comprising in combination, a plurality of units each consisting of a tubular member and a separator in communication therewith, means to effect a flow of gas through each member, means to feed finely divided material into the first of said members, separate it in the separator associated therewith and feed it into the second member, and so on through the remaining units, and means to conduct the gas separated in the last separator to the tubular member of the preceding unit, and so on back to the first unit.

18. Apparatus comprising in combination, a plurality of units each comprising a vertically disposed tubular member and a separator in communication therewith, means to effect a flow of gas through each member, means to feed finely divided material into the first of said members, separate it in the separator associated therewith and feed it into the second member, and so on through the remaining units, and means to conduct the gas separated in one of said separators to the tubular member of a preceding unit.

19. Apparatus according to claim 17 in which the separators are of the "cyclone" type.

20. Apparatus according to claim 17 in which said members are provided with heat transferring means.

In testimony whereof I hereunto affix my signature.

ERNEST B. MILLER.